March 31, 1942.  H. LIEBERHERR  2,278,181
ENGINE AND GEAR COUPLING
Filed May 15, 1940  4 Sheets-Sheet 1
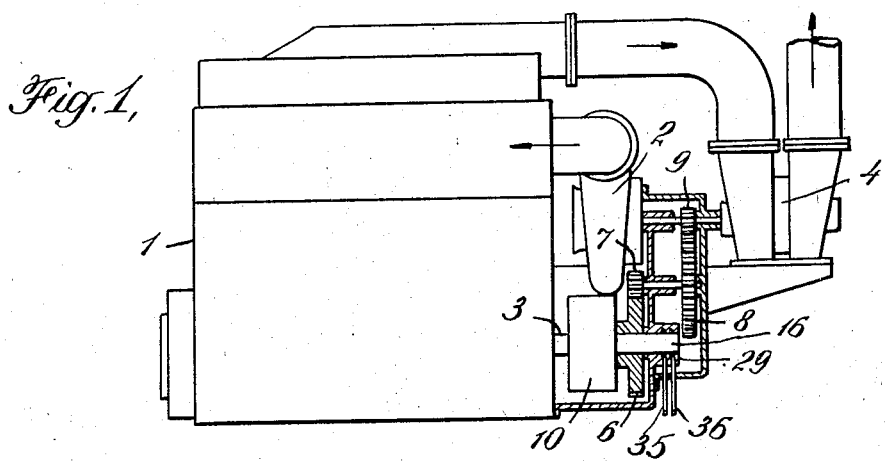
Fig. 1,
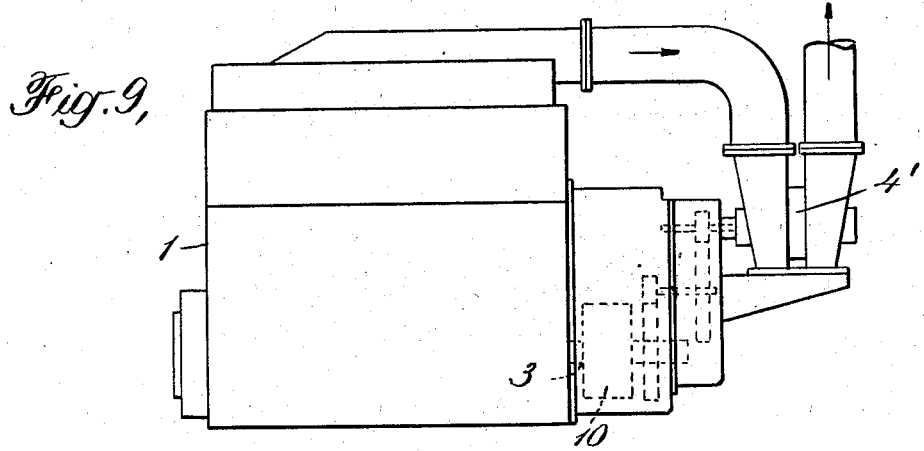
Fig. 9,
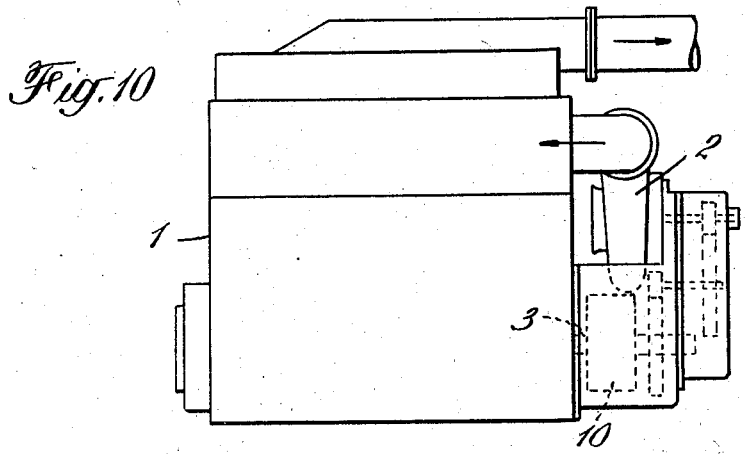
Fig. 10
INVENTOR
Hans Lieberherr
BY
Pennie, Davis, Marvin, Edmonds
ATTORNEYS March 31, 1942. H. LIEBERHERR 2,278,181
ENGINE AND GEAR COUPLING
Filed May 15, 1940 4 Sheets-Sheet 2

INVENTOR
Hans Lieberherr
BY
Pennie, Davis, Marvin Edmonds
ATTORNEYS

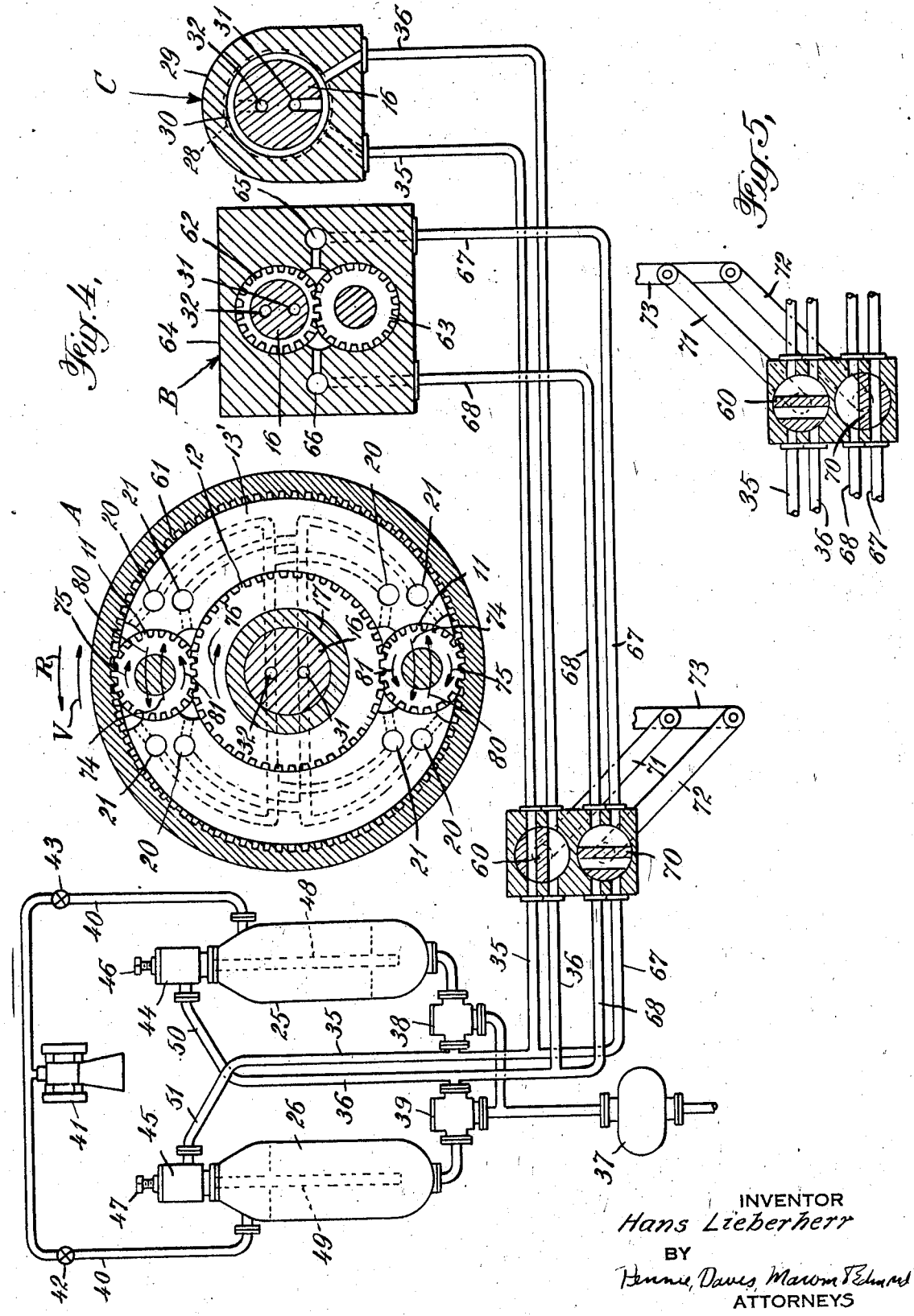

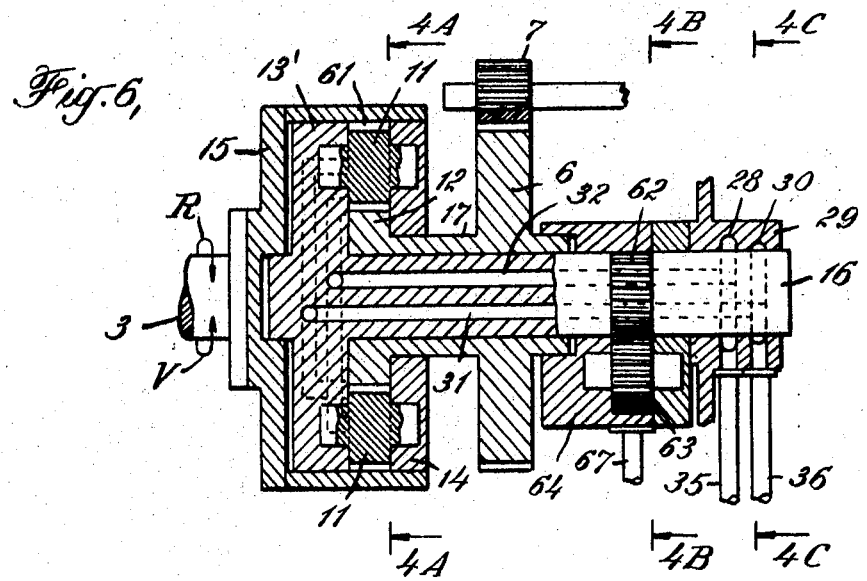
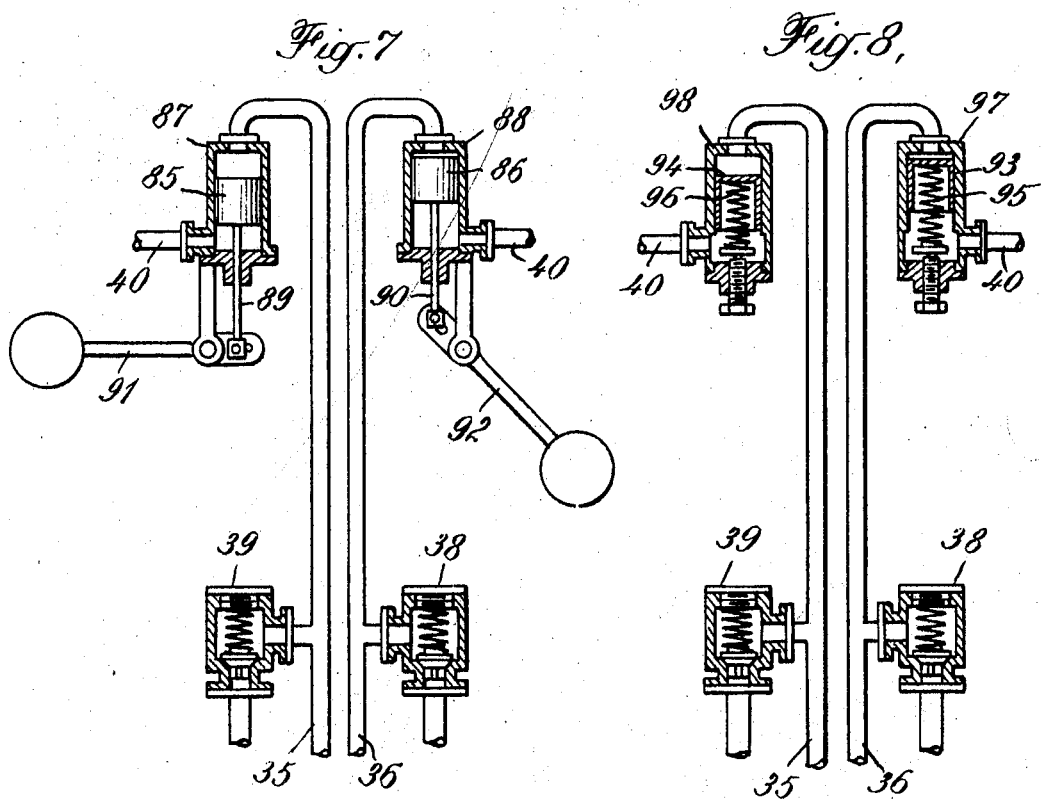

Patented Mar. 31, 1942

2,278,181

UNITED STATES PATENT OFFICE 2,278,181

ENGINE AND GEAR COUPLING

Hans Lieberherr, Winterthur, Switzerland, assignor to Sulzer Frères, Société Anonyme, Winterthur, Switzerland Application May 15, 1940, Serial No. 335,249
In Switzerland May 17, 1939

10 Claims. (Cl. 60—18)

This invention relates to apparatus for the coupling of a reciprocating engine to a turbo machine. The invention aims to provide a gear coupling for interconnecting the engine shaft and a turbo machine which is arranged to equalize the forces or torques transmitted between the engine and the turbo machine. The turbo machine may be a blower, for example a supercharging blower or a turbine. The coupling comprises a plurality of intermeshing toothed wheels (hereinafter called "gears") provided with a suitable closure, for example a casing, and a fluid system so arranged and connected to the coupling that the coupling may operate as a pump or as a motor.

The fluid system comprises an accumulator for the storage of the fluid under pressure, and suitable connecting conduit provided with means for controllably passing the fluid to and from the gears and the accumulator. The fluid system preferably includes two interconnected accumulators for the storage of a liquid, for example any suitable oil, and the liquid may be loaded, that is placed under pressure by means of a gas under pressure, a piston or the like.

The accumulator may be constructed to receive air under pressure and serve partly as an air vessel, and at least one relief valve may be connected to it, by means of which accumulating or compensating action can be variously adjusted. At least one gear mechanism may be provided for the forward running of the engine and at least one other gear mechanism for the reverse running of the engine. In addition to that, a reversing member may be provided to which the air vessel of the accumulator is connected alternately, according to the direction of rotation, to the gear mechanism for forward running, or to the gear mechanism for reverse running. To the air vessel of the accumulator a liquid pumping device or a device for supplying gas may be connected.

The pipe connections to the gear mechanism may be short circuited in order to put the gear coupling out of operation. With the engine working with supercharging through a turbo blower, the quantity or the pressure of the liquid in the accumulator may be adjusted to different valves in order to vary the supercharging pressure.

The accompanying drawings illustrate apparatus embodying the invention, in which:

Fig. 1 is a side view of a non-reversible internal combustion engine, turbo machine and gear coupling;

Fig. 4 illustrates more or less diagrammatically and with parts shown in section, a battery of accumulators, an enlarged cross-sectional view along the line 4A—4A (part A), a cross sectional view along the line 4B—4B (part B), and a cross sectional view along the line 4C—4C (part C) each of Fig. 6;

Fig. 5 is a fragmentary view of the multi-way cocks of Fig. 4 in different positions;

Fig. 6 is a side view with parts shown in section of a modified form of gear coupling;

Figs. 7 and 8 are more or less diagrammatic illustrations of modified forms of accumulators; and Figs. 9 and 10 are side views of modified forms of apparatus utilizing the gear coupling of the invention.

Figure 2:
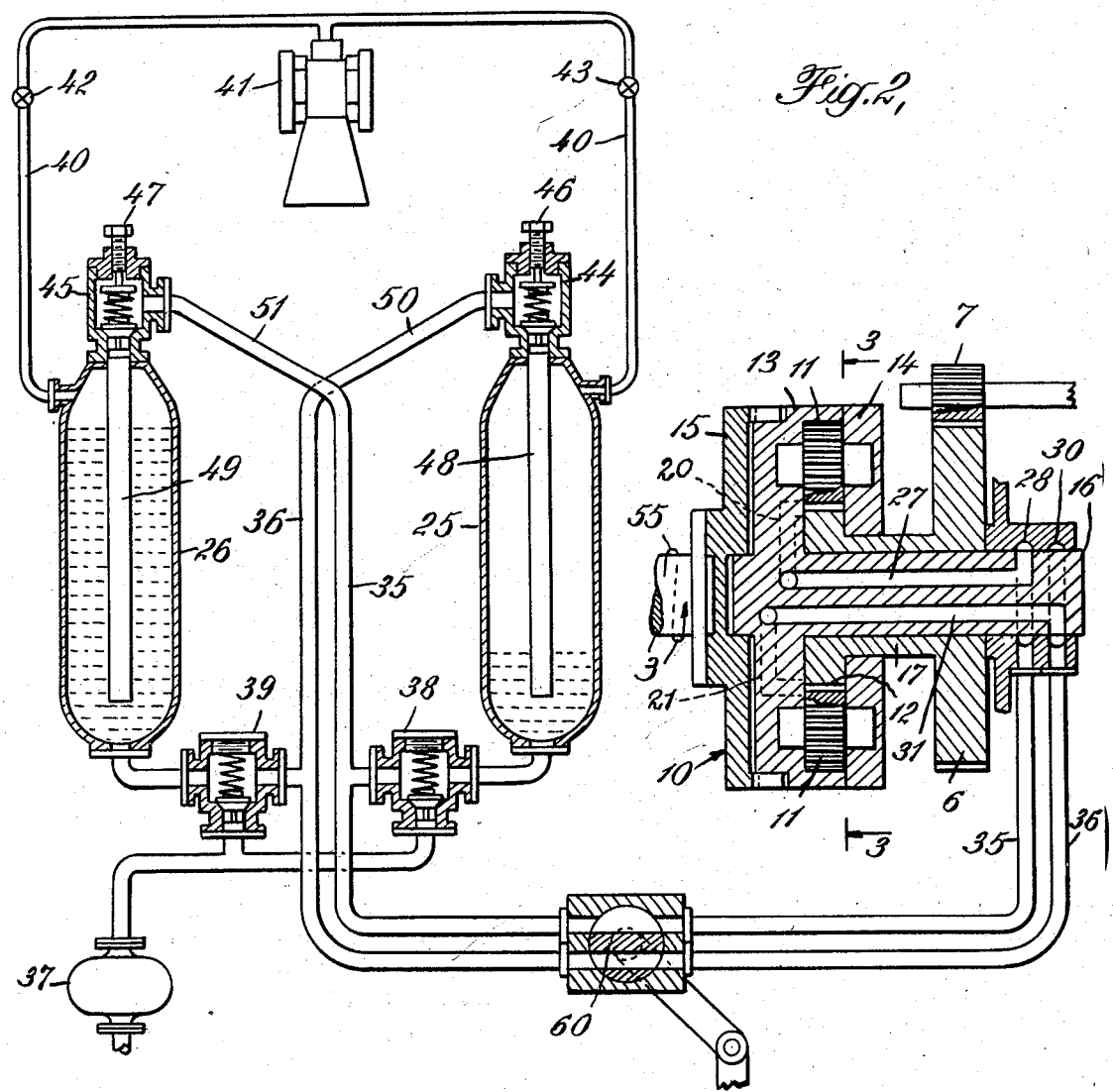
Fig. 2 is a more or less diagrammatic illustration of a coupling and fluid system connected thereto.

The apparatus illustrated in Fig. 1 comprises an internal combustion engine 1, preferably of the non-reversible type, provided with a supercharging blower 2 driven partly by the crankshaft 3 and partly by an exhaust gas turbine 4. The blower 2 is preferably directly coupled to the turbine 4 and indirectly coupled to the crankshafts through change-speed gears 6, 7, 8 and 9 to the gear coupling 10.

The gear coupling 10 comprises spur gears 11 meshing with the central gear 12. These gears are enclosed by a casing formed of the casing member 13 and the cover 14 in such a way that the gears may operate not only as a liquid pump, but also as a liquid motor as hereinafter described. The crankshaft 3 is rigidly connected to the casing member 13 by an intermediate coupling member 15. In case of necessity a part or the whole of the power output of the internal combustion engine may be transmitted to the shaft 16 connected to the casing member 13. The gear 12, hollow shaft 17 and gear 6 are integral; however, the gear 12 and gear 6 may be keyed to a hollow shaft such as shaft 17.

The ducts 20 and 21 (Fig. 3) of the casing member are each connected to a liquid pressure accumulator 25 and 26 respectively (Fig. 2). The accumulators 25 and 26 and the pipes connected thereto form an accumulator system. It is understood that other suitable systems may be arranged in various ways without departing from the invention. The duct 20 is connected through the duct 27 (Fig. 2) with the annular space 28 of the bearing 29 and the duct 21 is connected with the annular space 30 through the duct 31. The two annular spaces 28 and 30 are connected by pipes 35 and 36 with the liquid pressure accumulators 25 and 26 respectively.

A liquid pressure medium, for example oil under pressure, is supplied by means of the pump 37 through the non-return valves 38 and 39 to the pipes 35 and 36 and to the pressure accumulators 25 and 26. The liquid pressure accumulators 25 and 26 are also connected through pipes 40 with a compressor 41, by means of which a gaseous pressure medium, for example compressed air, can be introduced into the accumulators (air vessel parts) to act as a pressure cushion. The pipes 40 may be closed by means of the valves 42 and 43 when a sufficient pressure cushion is available in the accumulators.

The accumulators 25 and 26 have relief valves 44 and 45, and the pressure at which they blow off may be adjusted as desired by means of the screws 46 and 47 respectively. Since the relief valves are connected to the dip pipes 48 and 49, only the liquid at the bottom of the accumulators, but not the gas located above the liquid as a cushion, can flow out. The liquid flowing out of the accumulator 25 passes through pipe 50 into pipe 36 which is connected to accumulator 26 through valve 39, and the liquid flowing from the accumulator 26 passes through pipe 51 into pipe 35 which is connected to accumulator 25 through valve 38.

Figure 3:
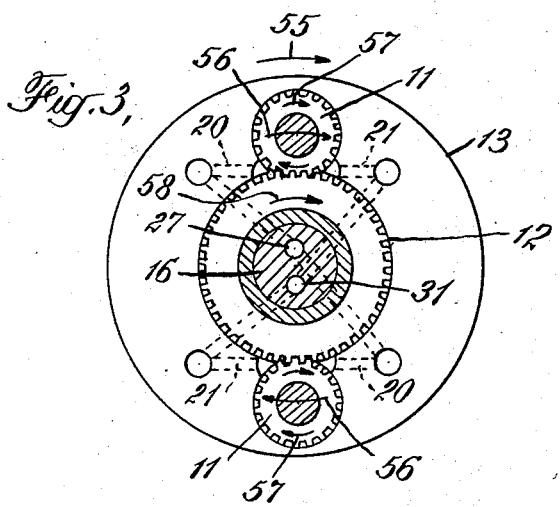
Fig. 3 is a sectional view along the line 3—3 of Fig. 2.

When the machinery is set into motion, the engine crankshaft begins to rotate in the direction of the arrow 55 (Fig. 2), while the blower, the change-speed gear and also the gear 12 remain at rest in consequence of their inertia. The gears 11 turn on the gear 12, which is at rest, in the direction of the arrows 56 (Fig. 3). Relatively to the casing, consequently, the gears 11 rotate in the direction of the arrows 57. In this way gears 11 and 12 begin to act as a pump and liquid is delivered from duct 20 into duct 21. From the accumulator 26 liquid flows through the pipe 35 to the annular space 28 and duct 27. The displaced liquid flows through duct 31, annular space 30 and pipe 36 into the pressure accumulator 25 and thereby compresses the air cushion above the liquid. Consequently the pressure in accumulator 25 rises in comparison with the pressure in accumulator 26.

In consequence of the transmission through the change-speed gear, the gas blower wheel rotates at a speed several times greater than that of the crankshaft, so that a considerable amount of kinetic energy must be stored in it before it can come up to service speed. The resistance at the gears 11 against the relative rotation caused by the rolling, increases only when the pressure difference between the accumulators 26 and 25 increases. This relative rotation becomes slower, and in proportion to the slowing down, the gear 12 begins to rotate in the direction of the arrow 58 (Fig. 3), until, in the steady state, the pressure difference between the accumulators 26 and 25 is large enough to prevent rotation of the gears 11 relative to the casing 13, so that the gear 12 turns at the same speed as the crankshaft 3. The rotating masses of the blower and of the change-speed gear are then accelerated to their service speed.

If fluctuations occur in the engine torque during service, for example in consequence of a change in angular velocity at the crankshaft, in the known forms of construction, the forces in the transmitting elements become increased in consequence of the considerable kinetic energy of the rotating masses of the gas blower.

When the speed of the engine accelerates in comparison with the speed of the gas blower, the gears 11 and 12 continue to act as a pump. Consequently more liquid is delivered from the duct 20 to the duct 21 and the pressure in accumulator 26 therefore rises still further as compared with the pressure in accumulator 25. The speed of the blower increases slowly in accordance with the energy stored in accordance with the pressure difference between the accumulators 25 and 26. Any undue acceleration of the blower and impermissible forces due to the rotating masses and the transmission are prevented.

If the speed of rotation of the crankshaft is retarded in comparison with the speed of rotation of the blower shaft, the liquid in duct 21 and the accumulator 26 will be reduced in pressure. The gears 11 and 12 then act as a liquid motor which is driven by the energy stored in accumulator 26 and this consequently prevents the speed of rotation of the blower shaft from being too quickly retarded. Consequently there cannot be any dangerous forces caused by inertia and transmission.

The storing and discharging of energy in and from the accumulators 25 and 26, and also the action of the gears as liquid pump and as liquid motor, result in that, when the angular velocity of a crankshaft is subject to periodic fluctuations and when other rapid changes in rotation may occur, the transmitting devices, particularly the gears, are protected from becoming too highly stressed in consequence of inertia forces. In addition to that, the energy which is superfluous at the time of the acceleration is not lost, but is stored and can be utilized during the retarding period.

By appropriate adjustment of the screws 46 and 47 on the relief valves of the accumulators, a greater or less flexible action may be obtained. Should the resistance of the blower become too great, for example because of some damage, the liquid pumped between the gears 11 and 12 will simply flow over through the valve 45 and the pipe 51 from accumulator 26 into accumulator 25. The gears then act as a slip coupling, and the transmission gear cannot be damaged.

In addition to that, it is possible through a multi-way cock 60 (Fig. 2) fitted in the pipes 35 and 36 to short-circuit the two ducts 20 and 21 so that the gears no longer transmit any power from the crankshaft to the blower. The blower is then at rest, unless it is driven by an exhaust gas turbine, and the internal combustion engine works without supercharging.

The apparatus shown in Figs. 4 and 6 is for reversible machines, and comprises an intermediate coupling member 15 connected to a ring gear 61 with internal teeth which mesh with the spur gears 11. The gears 11 transmit the power to the central gear 12, which drives the wheels 6 and 7 of the change-speed gear over hollow shaft 17. The gears 11, 12 and 61 form an epicyclic gear train. The teeth of the ring 61 and of the gears 11 and 12 are enclosed by a casing formed by the casing member 13' and cover 14. The gears 11 can thus work together with gears 12 and 61 as a liquid pump or as a liquid motor. The ducts 20 and 21 are connected through the pipes 35 and 36 with the accumulators 25 and 26 respectively, as shown in Fig. 4. Ducts 20 and 21 are connected through the casing member 13 (Fig. 6) and the shaft 16 connected with it through the annular spaces 28 and 30 of the bearing 29 by means of the ducts 31 and 32 as shown in Fig. 4 to the right.

The casing member 13' and the shaft 16 are not directly connected to the crankshaft; the shaft 16 can turn with respect to the crankshaft. Between the casing member 13' and the bearing 29 a gear 62 is keyed on shaft 16, and this gear meshes with a second gear 63. The two gears are surrounded by a stationary casing 64 and connected with ducts 65 and 66 in such a way that the gears may act not only as liquid pump but also as liquid motor.

The ducts 65 and 66 are connected through pipes 67 and 68 to the pipes 35 and 36 respectively. By means of the valve 70, it is possible either, as shown in Fig. 4, to close the connections to pipes 35 and 36, and to short-circuit pipes 67 and 68, or, as shown in Fig. 5, to connect pipes 67 and 68 to pipes 35 and 36. The valves 60 and 70 are connected together by means of levers 71 and 72 and rod 73 so that, in the forward turning of the engine, valve 60 is set to connect ducts 20 and 21 and the pressure accumulators, and valve 70 is set to short-circuit ducts 65 and 66; and in the reverse turning of the engine, the valve 70 is set to connect ducts 65 and 66 to the pressure accumulators and valve 60 is set to short-circuit ducts 20 and 21.

When the engine is running forward and the valves 60 and 70 are in the positions shown in Fig. 4, the crankshaft turns in the direction shown by arrow V. Because of the short-circuiting of the ducts 65 and 66, the two wheels 62 and 63 encounter no resistance, shaft 16 and the casing member are consequently free to rotate. In consequence of the inertia of the blower wheel and of the change-speed gear, gear 12 remains at first at rest, so that the gears 11 can turn on it. In this way there is rotation of the axes of gears 11 and of casing member 13' in the direction of the arrow 74 and a relative rotation of gears 11 with regard to the casing in the direction of arrow 75.

From the duct 20 liquid is delivered to the duct 21. The liquid delivered flows through pipe 36 into pressure accumulator 26 and compresses the gas cushion. The pressure in accumulator 26 rises as compared with the pressure in accumulator 25, and this acts as a brake on the relative rotation of the gears 11. According to the strength of the braking, the gear 12 is carried along in the direction of the arrow 76 until finally, in the steady state, gear 12 rotates with the same angular velocity as the gear 61 and the crankshaft.

If there are any fluctuations in the speed or in the torque, the gears come into action, according to the change of the pressures on the gears, either as a pump, thereby increasing the pressure difference between accumulators 25 or 26, or as a motor, thereby utilizing the pressure difference between accumulators 25 and 26. By change in the pressure difference, or by the flexible transmission thereby obtained between crankshaft and compressor, any undue increase in the accelerating or retarding forces and stresses is prevented.

When the engine is running in reverse, the crankshaft turns in the direction of arrow R. The valves 60 and 70 are set in the positions shown in Fig. 5 for reverse running. In consequence of its inertia the gear 12 remains at first at rest. Thereby gears 11 turn in the direction of arrow 80 on the gear 12. Consequently there is relative rotation in the direction of arrows 81. While gears 11 are rolling along gear 12, the casing member 13', the shaft 16 and the gears 61 and 63 also rotate in the direction of arrows 80. Then liquid is delivered from duct 65 to duct 66. The delivered liquid flows through pipes 68 and 36 to the liquid accumulator 26. Consequently the pressure in liquid accumulator 26 becomes greater than the pressure in accumulator 25.

As the overpressure rises, the resistance against the rotating of gears 62 and 63, of shaft 16 and of casing member 13' increases, until they come to rest. The gears 11 will consequently stop running around gear 12, so that gear 12 will rotate in the direction of arrow 76 through gear 61 and over gears 11. The gear 12 and also the blower are always driven in the same direction as shown by the arrow 76 when the shaft 16 is rotating forward (V) as well as when it is rotating backward (R).

When the speed or the torque fluctuates, a variable resistance acts on the casing member 13' and consequently on the gears 62 and 63. The gears will consequently act either as a liquid pump and increase the pressure difference of accumulators 26 and 25, or they will act as a liquid motor and decrease this pressure difference. The coupling may also act as a free-wheel mechanism when, for instance, the speed of the reciprocating engine is to be quickly reduced. In consequence of the stored kinetic energy, the turbo machine will then take a longer time to come to rest. In this way any impermissible accelerating or retarding of the blower shaft is prevented, so that no impermissible forces due to inertia and torques can arise.

The liquid in the accumulators may be loaded, instead of through a gas cushion, by means of a piston under the influence of a weight (Fig. 7). Pistons 85 and 86 of the accumulators 87 and 88 are connected through the rods 89 and 90 to the weighted levers 91 and 92. If the pressure increases at one piston it is pressed downwards, and then the force exerted on it by the weight is increased.

The liquid in the accumulators may be loaded as shown in Fig. 8 in which the pistons 93 and 94 are loaded by the springs 95 and 96 in the accumulators 97 and 98 respectively. The spring pressure exerted on the pistons increases with the displacement of the pistons, so that an accumulating action is also thereby obtained.

In the case of internal combustion reciprocating engines, the overpressure valves 44 and 45 may also be utilized for varying the supercharging pressure. If the tension of the valves is reduced until slip occurs in the toothed wheel coupling, the supercharging pressure will also be reduced in accordance with the reduced speed of the blower.

As shown in Fig. 9, the engine 1 has a shaft 3 connected through coupling 10 to a gas blower 4'. As shown in Fig. 10, the engine 1 has a shaft 3 connected through the coupling 10 to a supercharging blower 2.

The invention may be adopted also, for instance, for additional drive of the crankshaft of a reciprocating engine by means of an exhaust turbo blower as shown in Fig. 1.

I claim:

1. A gear coupling for interconnecting an internal combustion engine and a turbo machine which comprises a rotatable casing, spur gears rotatable in the casing, a central gear meshing with the spur gears, means for operatively interconnecting the engine and the turbo machine, a fluid system including means for supplying a liquid between the gears, an accumulator for storing the liquid, separate pipes connecting the gears to the accumulator for delivering liquid to the gears and for removing the liquid from the gears, and means for loading the liquid in the accumulator to increase the pressure thereon, whereby the gear coupling may operate as a liquid pump or as a liquid motor.

2. A gear coupling according to claim 1, in which at least two interconnected accumulators are connected to the pipes, and each accumulator has an adjustable relief valve.

3. A gear coupling according to claim 1 which comprises a valve for short-circuiting the conduits to put the gears out of operation.

4. A gear coupling for interconnecting an internal combustion engine, a turbo machine which comprises a set of epicylic gears arranged for the transmission of power in the forward running of the engine, another set of gears arranged for the transmission of power in the reverse running of the engine, at least two interconnected accumulators for the storage of liquid, means controlling the pressure on the liquid, separate pipes connecting the gear train and the set of gears with each accumulator, and valve means for short-circuiting one set of gears or for permitting flow of liquid between an accumulator and a set of gears depending upon the direction of rotation of the engine.

5. A gear coupling according to claim 4 in which the epicyclic gear train comprises a ring gear, a plurality of spur gears meshing with the ring gear, a central gear meshing with the spur gears, and ducts for supplying liquid between the spur gears and the ring gear and between the central gear and the spur gears.

6. A gear coupling for interconnecting an internal combustion engine and a turbo machine which comprises a plurality of intermeshing gears including a ring gear, at least one spur gear and a central gear, means for coupling the ring gear to the engine and the central gear to the turbo machine, and a fluid system including at least one accumulator for storing a fluid under pressure, ducts connecting the gears to the accumulator, whereby the gears may act as a pump for forcing liquid into the accumulator and also as a motor in being driven by fluid flowing through one of the ducts from the accumulator to the gears.

7. A gear coupling for equalizing the forces between a reciprocating engine and a rotatable machine which comprises at least two gears in mesh with each other, a casing enclosing the gears and providing a space where the gears mesh for a liquid, means for operatively interconnecting the gear coupling to the engine and to the rotatable machine, an accumulator system arranged to store liquid under pressure connected by pipe to the said space, and means permitting the gears to act as a pump to force liquid into the accumulator system and to act as a motor when liquid flows from the accumulator system to the said space.

8. A gear coupling for equalizing the forces between a reciprocating engine and a rotatable machine which comprises a set of gears comprising at least two gears in mesh with each other which is operable in the forward running of the engine, an enclosure for the gears, an enclosed space between the gears and the enclosure for a liquid, a liquid accumulator system connected by pipe to the enclosed space, means for causing the set of gears to operate not only as a liquid pump in charging liquid into the accumulator system, but also as a liquid motor in receiving liquid in the enclosed space under pressure from the accumulator system, a second set of gears which is operable in the reverse running of the engine, valve means for connecting or disconnecting the liquid accumulator system with each set of gears, whereby the first-mentioned set of gears may be used in the forward running of the engine while the second set of gears is inoperative and the second set of gears may be used in the reverse running of the engine while the first-mentioned set of gears is inoperative, and means interconnecting the engine, the coupling and the rotatable machine.

9. A gear coupling for equalizing the forces between a reciprocating engine and a rotatable machine which comprises a set of gears comprising at least two gears in mesh with each other which is operable in the forward running of the engine, an enclosure for the gears, an enclosed space between the gears and the enclosure for a liquid, a liquid accumulator system connected by pipe to the enclosed space, means for causing the set of gears to operate not only as a liquid pump in charging liquid into the accumulator system, but also as a liquid motor in receiving liquid in the enclosed space under pressure from the accumulator system, a second set of gears which is operable in the reverse running of the engine, valve means for connecting or disconnecting the liquid accumulator system with each set of gears, whereby the first-mentioned set of gears may be used in the forward running of the engine while the second set of gears is inoperative and the second set of gears may be used in the reverse running of the engine while the first-mentioned set of gears is inoperative, and means interconnecting the engine, the coupling and the rotatable machine, said two sets of gears being so arranged that the rotatable machine rotates in the same direction in both the forward and the reverse running of the engine.

10. A gear coupling for equalizing the forces between a reciprocating engine and a rotatable machine which comprises a set of gears comprising at least two gears in mesh with each other which is operable in the forward running of the engine, an enclosure for the gears, an enclosed space between the gears and the enclosure for a liquid, duct means connecting the enclosed space on one side of the gears with an accumulator, other duct means connecting the enclosed space on another side of the gears with another accumulator, said gears being arranged to act as a pump in receiving liquid from one accumulator and forcing it into the other accumulator and also as a motor in receiving liquid from one accumulator and forcing it to the other accumulator, a second set of gears having an enclosure and a space between the enclosure and the gears for a liquid, duct means connecting the enclosed space on one side of the second set of gears with one of the accumulators, other duct means connecting the enclosed space on another side of the gears with the other accumulator, said second set of gears being arranged to act as a pump in receiving liquid from one accumulator and forcing it into the other accumulator and to act as a motor in receiving liquid from one accumulator and forcing it into the other accumulator, and means for selectively using one set of gears for the forward running of the engine and the other set of gears in the reverse running of the engine.

HANS LIEBERHERR.